(12) United States Patent
Bulin et al.

(10) Patent No.: US 8,596,037 B2
(45) Date of Patent: Dec. 3, 2013

(54) NACELLE WITH A DISPLACEMENT DEVICE FOR AIRCRAFT JET ENGINE AND AIRCRAFT INCLUDING SUCH NACELLE

(75) Inventors: Guillaume Bulin, Blagnac (FR); Patrick Oberle, Verdun sur Garonne (FR); Thierry Surply, Cornebarrieu (FR)

(73) Assignee: Airbus Operations S.A.S., Toulouse (FR)

( * ) Notice: Subject to any disclaimer, the term of this patent is extended or adjusted under 35 U.S.C. 154(b) by 1167 days.

(21) Appl. No.: 12/521,869

(22) PCT Filed: Dec. 27, 2007

(86) PCT No.: PCT/FR2007/002176
§ 371 (c)(1),
(2), (4) Date: Jul. 1, 2009

(87) PCT Pub. No.: WO2008/102079
PCT Pub. Date: Aug. 28, 2008

(65) Prior Publication Data
US 2009/0277155 A1    Nov. 12, 2009

(30) Foreign Application Priority Data
Jan. 2, 2007    (FR) ...................................... 07 00004

(51) Int. Cl.
*F02K 3/02* (2006.01)
(52) U.S. Cl.
USPC .......... 60/226.3; 60/771; 60/226.2; 60/226.1; 239/265.27
(58) Field of Classification Search
USPC ................ 60/771, 770, 230, 231, 785, 226.1, 60/226.2, 226.3; 244/110 B, 130, 53 R; 239/265.17, 265.19, 265.23, 265.25, 239/265.27, 265.29, 265.31
See application file for complete search history.

(56) References Cited

U.S. PATENT DOCUMENTS

| 4,047,381 | A | * | 9/1977 | Smith | .......................... 60/226.2 |
| 5,655,360 | A | | 8/1997 | Butler | |
| 5,904,320 | A | * | 5/1999 | Tindell | ....................... 244/110 B |
| 7,818,958 | B2 | * | 10/2010 | Bulin et al. | .................. 60/226.1 |

FOREIGN PATENT DOCUMENTS

FR    1 479 705    5/1967
GB    1 357 370    6/1974

OTHER PUBLICATIONS

U.S. Appl. No. 12/443,343, filed Mar. 27, 2009, Bulin, et al.

* cited by examiner

*Primary Examiner* — Gerald L Sung
*Assistant Examiner* — Craig Kim
(74) *Attorney, Agent, or Firm* — Oblon, Spivak, McClelland, Maier & Neustadt, L.L.P.

(57) ABSTRACT

A nacelle, for an aircraft jet engine having a high bypass ratio, in which a jet engine having a longitudinal axis is mounted. The nacelle includes a wall that concentrically, and at least partially, surrounds the jet engine and together defines an annular duct. The nacelle further includes a displacement device that controllably displaces a portion of the nacelle wall in order to modify the section of the flow outlet passage and form at least one longitudinally extending opening. A device for forming a fluid barrier along the at least one longitudinally extending opening is provided to counteract the natural exhaust.

15 Claims, 7 Drawing Sheets

NACELLE WITH A DISPLACEMENT DEVICE FOR AIRCRAFT JET ENGINE AND AIRCRAFT INCLUDING SUCH NACELLE

The invention relates to an aircraft engine nacelle equipped with a variable nozzle system.

Variable nozzle systems were initially developed for military aeronautical applications.

These systems permit a significant improvement in the thermodynamic performances of a turbojet.

Traditionally, turbojets installed on airliners are not equipped with variable nozzle systems.

In fact, the traditional variable nozzle systems result in very severe dimensioning constraints, which are directly related to the perimeter of the nozzle whose cross section must be modified.

As it happens, turbojets with which airliners are equipped are characterized by substantially high bypass ratios of between 4 and 8, which lead to relatively large nozzle diameters.

For this reason the integration of traditional variable nozzle systems in airliners poses the risk of significantly increasing the complexity and weight of the engine nacelle while reducing the aerodynamic properties of the propulsion assembly, which is unacceptable.

The object of the present invention is an aircraft engine nacelle having a high bypass ratio, wherein there is installed an engine with longitudinal axis, the nacelle having a wall concentrically surrounding the engine at least partially and defining therewith an annular internal fluid flow conduit having at a downstream end of the nacelle wall, a flow-outlet passage cross section, characterized in that the nacelle is equipped with means for displacement, on command, of a part of the nacelle wall in order to vary the flow-outlet passage cross section, this displacement creating, in the nacelle wall, at least one aperture with longitudinal extension, the nacelle being provided with a device for forming a fluidic barrier (fi), which extends along at least part of the longitudinal extension of the said at least one aperture in order to oppose the natural escape, through the said at least one aperture, of part of the flow known as leakage flow.

By varying the outlet passage cross section of the flow by displacement of part of the nacelle wall, there is achieved in simple and lightweight manner a nozzle of variable cross section in a turbojet with high bypass ratio and even very high bypass ratio.

In addition, the fluid-control device makes it possible in simple manner to limit or even prevent the natural passage of part of the internal flow (leaks) through the aperture or apertures made in the wall. In fact, the device creates in the aperture or apertures, or in the proximity of the inlet thereof, an obstacle in the form of a controlled fluid circulation. This fluidic screen extends longitudinally along the longitudinal extension of the aperture or apertures. The presence of this fluidic obstacle thus channels the internal fluid flow in the annular conduit.

Therefore the leakage flow cannot develop by escaping from the nacelle via the created aperture or apertures (albeit with the exception, under certain circumstances, of a flow of very small and insignificant magnitude). By virtue of the invention, therefore, almost all of the internal fluid flow contributes to the engine thrust, and it does so directly. The invention therefore makes it possible to increase the efficiency of the engine equipped with a variable nozzle system compared with an engine equipped with a variable nozzle system in which the entire leakage flow would escape via the aperture or apertures created by the variable nozzle mechanism.

By preventing almost of this leakage flow from developing there is achieved a significant reduction in aerodynamic losses compared with an engine that would be provided solely with a variable nozzle system lacking a fluidic barrier: the turbulence phenomena are almost cancelled out, thus diminishing the drag. The aerodynamic performances of the propulsive assembly are therefore improved.

In the case of a turbojet with high bypass ratio, the diameter of the fan is very large, so that the variation of the flow-outlet passage cross section that can be achieved is sufficiently large to have a strong effect on the fan behavior. The efficiency of the propulsion system is then increased during each flying phase.

Furthermore, the adaptation of a variable nozzle system on turbojets installed on airliners makes it possible to reduce, in low-speed flying phases (takeoff, approach and landing), the velocities of ejection of air downstream from the turbojet, with a commensurate reduction in associated noise emissions. This advantage is a determining parameter in the current aeronautical context, where acoustic constraints with respect to airliners are becoming increasingly drastic.

A variable nozzle system therefore exhibits clear advantages in terms of aerodynamic and thermodynamic performances when it is integrated in a turbojet with high or even very high bypass ratio.

According to one characteristic, the device for forming a fluidic barrier is equipped with means for injection of a high-energy fluid at right angles to the said at least one aperture.

This fluid-control device, simple and efficient, relies on fixed fluid injection means, and the energy used can be obtained from the nacelle itself (example: pressurized air coming from the engine).

At least one of the thermodynamic and aerodynamic parameters of the injected fluid makes it possible to control the direction imparted to the injected fluid flow and the magnitude of this flow.

It will be noted that the same thermodynamic and aerodynamic parameter or parameters may be used to control both the orientation and magnitude of the injected fluid flow.

In general, the efficiency of the fluidic inductor (percentage of controlled leaks relative to the total leaks without fluid-control device) is a function of aerodynamic properties (velocity, turbulence ratio, etc.) and thermodynamic properties (pressure, temperature, flowrate, etc.) of the injected high-energy fluid.

According to one embodiment, the nacelle is also equipped with a fluid-control device for controlled withdrawal of at least part of the internal fluid flow, in order to evacuate it from the nacelle through the said at least one aperture.

The nacelle is therefore equipped with two fluid-control devices that function differently and not simultaneously: one to oppose the passage of all or part of the leakage flow through the said at least one aperture, and the other to withdraw an amount of internal flow in controlled manner and to evacuate it in a controlled direction (toward upstream, transversely or toward downstream).

According to one characteristic, the fluid-control device for controlled withdrawal is equipped with means for injection of a high-energy fluid into the internal fluid flow.

According to one characteristic, the injection means are mounted upstream and/or downstream from the said at least one aperture.

According to one characteristic, the injection means are mounted on an internal face and/or an external face of the nacelle wall that bounds the annular conduit at its external periphery.

When the injection means are mounted on an internal face and on an external face of the nacelle wall, a dual controlled fluid circulation is therefore available: the controlled circulation by virtue of the fluid injected from the external face of the wall in order to form a fluidic obstacle in the aperture or apertures, and the controlled circulation by virtue of the fluid injected from the internal face in order to obtain a fluidic thrust-inversion system.

It will be noted, however, that the second controlled circulation acting from the internal face of the wall may itself be used alternatively to form a fluidic obstacle at right angles to the said at least one aperture.

According to one characteristic, the device for forming a fluidic barrier is equipped with at least one mobile element for deflecting the injected fluid, which element is disposed adjacent to the injection means mounted on the internal face of the nacelle wall, at least partly in the said at least one aperture.

The deflecting element functions to divert the injected fluid flow in order to give it a direction substantially parallel to the internal face of the wall. In the absence of this element distinct from the wall, the injected fluid flow would adhere to the tangential surface at the discharging end of the injection means.

The fluid injected and thus oriented in controlled manner forms a fluidic barrier that flows at the periphery of the internal flow, at right angles to the said at least one aperture.

More particularly, the fluid is injected from a zone situated upstream from the said at least one aperture.

According to one characteristic, the said at least one deflecting element blocks a so-called upstream zone of the said at least one aperture, thus causing a so-called downstream zone thereof to be free.

The fluid flow injected and diverted in this way by the deflecting element acquires a trajectory that is substantially parallel to this element and circulates at right angles to the upstream zone of the aperture, or in other words along the deflecting element, and along the downstream zone of the aperture in order to mask this zone from the internal flow.

According to one characteristic, the said at least one deflecting element is capable of being seated in a recess of the mobile part of the nacelle wall.

This arrangement makes it possible to obtain, in collapsed position, internal aerodynamic lines in the nacelle that limit the aerodynamic drag of the propulsive assembly.

When injection means are mounted downstream from the said at least one aperture, these injection means are, for example, mounted on an external face of the nacelle wall and are capable of creating a fluidic barrier along the longitudinal extension of the said at least one aperture.

According to one characteristic, the fluid-control device is equipped with at least one nozzle for injection of a high-energy fluid.

According to one characteristic, the said at least one injection nozzle has an annular or semi-annular shape.

According to one characteristic, the said at least one injection nozzle communicates with a fluid supply duct that is routed at least partly in the nacelle wall.

According to one characteristic, the injection of fluid is effected in continuous or pulsed manner.

According to one characteristic, the device has a curved surface, disposed tangentially at the discharging end of the injection means, in such a way as to direct the injected fluid toward the said at least one aperture.

The curved (convex) surface makes it possible to divert the high-energy fluid injected tangentially to this surface.

It will be noted that, when the injection means are mounted on the external face of the nacelle wall, the fluid is injected toward the annular conduit in such a way that it completely or partly blocks the passage of the leakage flow.

According to one characteristic, at the interior of the annular conduit, the engine has an external face and the displaceable part of the nacelle wall has an internal face, which cooperate with one another to cause a variation of the flow-outlet passage cross section when the said wall part is displaced.

According to one characteristic, the displaceable part of the nacelle wall is a downstream part of this wall that includes the trailing edge thereof and that is capable of being displaced longitudinally along the annular conduit, by translation toward downstream, between a first position, in which no aperture is created, and a second position, in which the aperture or apertures are created.

In terms of complexity, weight and aerodynamic drag, the translational nozzle system is the least penalizing system to be integrated in an engine with high bypass ratio. In fact, by using this system, the kinematics of the nozzle are reduced to simple translation of the rear part of the nacelle along the engine axis. In addition, the aerodynamic flows inside and outside the nacelle are only slightly perturbed in collapsed position.

Another object of the invention is an aircraft comprising at least two engine nacelles, each nacelle being in conformity with at least one of the aspects of the nacelle described briefly hereinabove.

Other characteristics and advantages will become apparent from the description hereinafter, provided solely by way of non-limitative example written with reference to the attached drawings, wherein.

Figure 11:
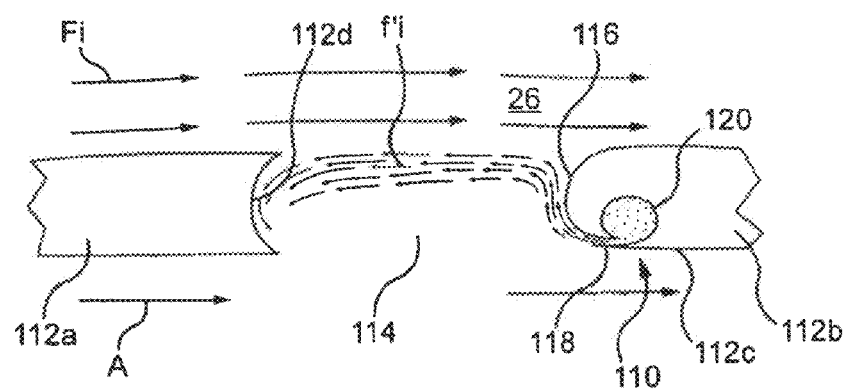

FIGS. 8a, 8b, 8c, 9a, 9b, 9c, 10a, 10b, 10c respectively illustrate several different views of a nacelle according to a third embodiment and several different modes of operation of the nacelle;

FIG. 11 represents a partial schematic view in longitudinal section (analogous to that of FIGS. 6 and 7) of a nacelle wall according to a fourth embodiment.

Figure 1:
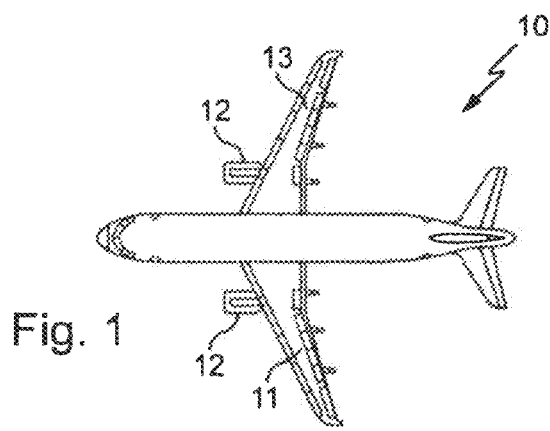
FIG. 1 is a schematic general view of an aircraft according to the invention.

As represented in FIG. 1 and denoted in general by the reference marked 10, a commercial aircraft (airliner) is equipped with a plurality of engine nacelles 12 fixed under the main wing of the aircraft.

As an example, aircraft 10 has two engine nacelles, each fixed on one of the side wings 11, 13, although it is possible, depending on the aircraft models, for a plurality of nacelles to be fixed to the same wing.

Furthermore, it is possible to envision fixing the engine nacelles directly on the fuselage, either on both sides of the fuselage or on the rear upper part of the fuselage.

Figure 2:
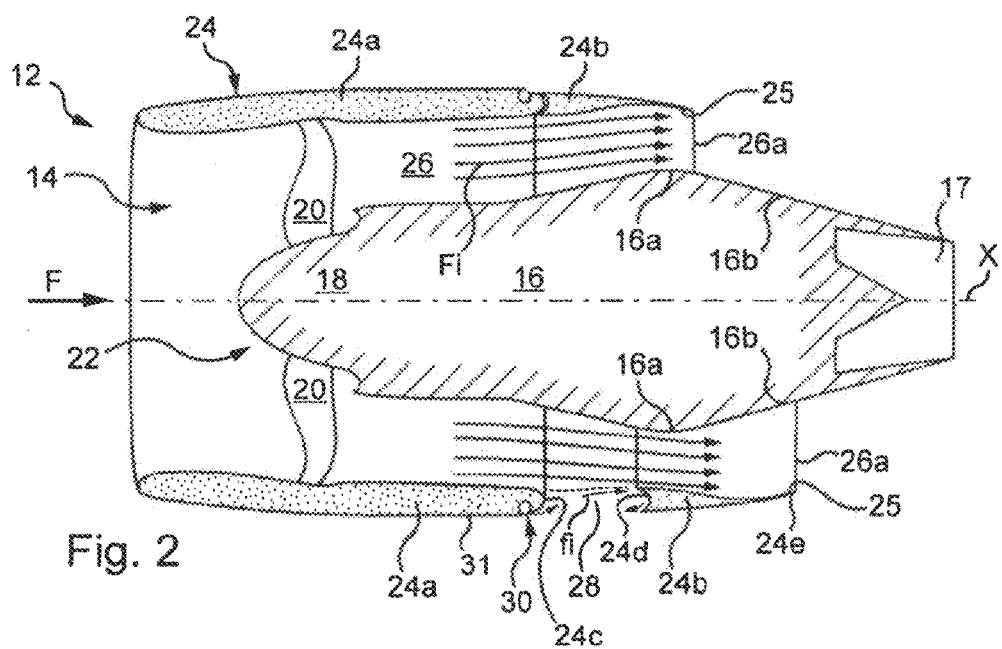
FIG. 2 is a schematic view in longitudinal section of an aircraft nacelle according to a first embodiment of the invention.

As represented in FIG. 2, one of the nacelles 12 according to the invention is schematically illustrated in longitudinal section.

An engine 14 having longitudinal axis X and installed inside the nacelle comprises a turbojet 16 equipped at the inlet, on the upstream end (at the left in the figure), with a shaft 18 on which there are mounted the blades 20 of a fan 22. The turbojet is of the dual-flow type with high bypass ratio (ratio greater than or equal to 5).

It will be noted that the invention also applies to turbojets having a very high bypass ratio (close to 10).

Nacelle 12 surrounds the upstream part of the aforesaid engine 14, while the downstream part thereof projects beyond the downstream part of the nacelle, as represented partly in FIG. 2.

More particularly, nacelle 12 is provided with a wall 24 that concentrically surrounds the engine in such a way as to define therewith an annular conduit 26, in which there flows a fluid, which in the present case is air.

As represented in FIG. 2, the air flow symbolized by arrow F arriving at the inlet of the nacelle penetrates to the interior thereof, and a first stream known as the primary stream penetrates into turbojet 16 to participate in combustion and to drive shaft 18 and therefore fan 22 in rotation. This primary flow is then ejected via nozzle 17 of the engine and thus contributes to part of the thrust of the turbojet.

A second air stream known as the secondary stream, propelled by the fan, follows annular conduit 26 and escapes via downstream part 26a of the nacelle, thus constituting the major part of the thrust of the propulsion system.

It is appropriate to note that wall 24 of the nacelle is made in two parts: a so-called upstream part 24a forming the aerodynamic fairing of the front part of the turbojet, and a so-called downstream part 24b that includes the trailing edge of the nacelle wall and that is mobile in longitudinal translation (along direction X) relative to the first fixed part.

As shown in FIG. 2, second part 24b is represented in the top part of this figure, in a first so-called collapsed position and for which the internal flow Fi to annular conduit 26, while being guided by the nacelle wall, traverses this conduit to its downstream discharging end 26a. This position is used in flying phases in which the invention is not employed.

It will be noted that turbojet 16 has an external surface 16a, whose diameter increases along conduit 26 as far as downstream end 26a (top part of FIG. 2). The shape of external surface 16a of the turbojet resembles a cone portion (frustoconical), whose apex is situated toward upstream.

The internal surface of downstream part 24b in turn exhibits a decrease of diameter along the conduit in the part close to downstream end 26a and as far as the latter. The shape of this part 25 of the internal surface resembles a cone portion whose apex is situated toward downstream.

Downstream part 24b of the nacelle wall is displaced on command (for example on the basis of a signal sent from the flight deck), in continuous or discontinuous translational movement (for example, under the action of hydraulic actuators mounted in wall part 24a, parallel to axis X), from the first collapsed position to a second so-called deployed position represented in the bottom part of FIG. 2.

In the second, deployed position, a radial or annular aperture 28 is created in wall 24. This aperture is positioned between upstream and downstream parts 24a and 24b respectively on the external periphery of annular conduit 26 and has a dimension or longitudinal extension parallel to longitudinal axis X.

It should be noted that downstream part 24b of the nacelle wall may be composed of a plurality of semi-annular portions (in the form of annulus portions), the joining of which forms a complete annulus and which can each be displaced independently.

The displacement of each semi-annular portion toward downstream thus creates a different semi-annular aperture in the nacelle wall.

The purpose of this displacement is to vary the outlet passage cross section for the flow inside the nozzle defined by the internal face of downstream wall 24b and the external face of turbojet 16 facing it.

Thus, when downstream part 24b is displaced toward the rear (bottom part of FIG. 2), the outlet passage cross section for the fluid flow at downstream end 26a is increased: a divergent section is formed between part 25 of the internal surface of downstream wall 24b and zone 16b of the external surface of the turbojet situated downstream from the region of maximum diameter. This causes a variation of the expansion ratio of the internal flow, which induces a maximum thrust.

It will be noted that upstream part 24a and downstream part 24b of the nacelle wall have complementary shapes at their end zones intended to come into contact with one another (junction zone), in order that the assembly composed of the two parts will be contiguous when they are in contact with one another (top part of FIG. 2).

Figure 3:
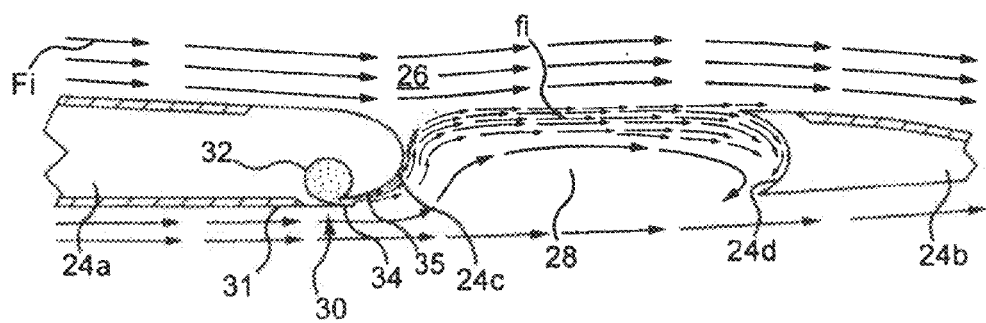
FIG. 3 is an enlarged partial schematic view of the fluid-control device of FIG. 2.

At their facing end zones, therefore, the two parts 24a and 24b have two respective faces with opposite curvatures: end surface 24c of front part 24a is convex, while end surface 24d of downstream part 24b is concave (FIGS. 2 and 3).

As represented at the bottom part of FIG. 2 and in FIG. 3, when the two end faces 24c and 24d are disconnected, they form the edges of aperture 28.

End face 24d merges into external face 24e of downstream part 24b at the junction between the two parts 24a and 24b.

It will be noted that, starting from end face 24d, downstream part 24b becomes increasingly narrower toward downstream as it approaches a profiled tip 24e, which forms a trailing edge.

Furthermore, in the absence of a supplementary device, a small part of the internal fluid flow $F_i$ circulating in conduit 26 would be able to escape naturally in radial direction via aperture 28.

This flow fraction is known as leakage flow.

A fluid-control device 30 is provided in the nacelle wall to create a fluidic obstacle intended to oppose all or part of this leakage flow.

As represented in FIG. 2 (and in more detailed manner in FIG. 3), fluid-control device 30 is mounted, for example, in fixed part 24a of the nacelle wall, or in other words upstream from aperture 28, and at the junction zone between parts 24a and 24b.

Device 30 is mounted on external face 31 of upstream wall part 24a of the nacelle.

Device 30 is provided with means that make it possible to inject a high-energy fluid at right angles to aperture 28, toward the annular conduit, when the mobile element or elements of the nacelle is or are displaced to bring about a variation of cross section of the variable cross section nozzle.

This injection of fluid is performed substantially tangentially to external face 31 of upstream part 24a.

More particularly, fluid-control device 30 is provided, close to end face 24c of upstream part 24a, with a supply duct for high-energy fluid, which is, for example, pressurized air arriving from the engine.

This fluid supply duct has a part, not illustrated, that communicates with the pressurized air source of turbojet 16 or with an auxiliary generator of pneumatic energy (such as a compressor).

The duct also has an annular part 32 partly represented in section in FIGS. 2 and 3. This duct 32 extends to the periphery of aperture 28 and is constructed in the form of one or more torus arcs or even as a complete torus mounted on external face 31 of the upstream wall part of the nacelle.

Fluid-control device 30 is additionally provided with one or more injection nozzles 34, which communicate with duct 32 and discharge onto external face 31 at the location where end face 24c begins.

In this way there is injected into aperture 28, from upstream, a high-energy fluid that forms a fluidic barrier $f_j$, which closes off the aperture or in any case limits access thereto by internal flow $F_i$ (FIG. 3).

This fluidic barrier extends along the entire longitudinal dimension of aperture 28, thus occupying almost all of the space that the flow $F_i$ could have used to escape via the aperture.

In FIG. 3, the injected fluid circulates in the same direction as internal flow $F_i$.

A curved surface 35 is disposed at the outlet of injection nozzle 34, tangentially thereto, and constitutes the surface of end face 24c. This surface has, for example, a semi-circular shape.

It will be noted that, when the duct is constructed in the form of toroidal sections (torus arcs) or even of a complete torus, the nozzle may have the form of a slit and extend along the entire length of the torus section (nozzle of semi-annular form) or of the complete torus (nozzle of annular form).

For a same torus section or for the complete torus, it is also possible to have a plurality of separate injection nozzles distributed over the section under consideration or over the torus.

As represented in FIGS. 2 and 3, the pressurized fluid being transported via duct 32 is introduced in the form of a jet into the aperture via injection nozzle 34, tangentially to external face 31.

The jet injected in this way exits the nozzle with a given orientation, tangentially to curved surface 35, then assumes the shape of this surface (FIG. 3), to the extent that the centrifugal force tending to detach it is balanced by the reduced pressure developed between the wall and the jet.

As represented in FIG. 3, the jet injected through injection nozzle 34 is diverted by surface 35 in the direction of annular conduit 26.

The energy input from the fluid injected via injection nozzle 34 makes it possible to control the direction of the injected fluid jet.

The orientation of the jet varies as a function of at least one of the thermodynamic and aerodynamic parameters of the fluid, namely the pressure and/or the temperature and/or the flowrate and/or the velocity and/or the turbulence ratio, etc.

The fluid jet injected via the fluid-control device and extending longitudinally at the inlet of the aperture makes it possible, by aerodynamic induction, to channel the internal fluid flow $F_i$ at aperture 28 substantially parallel to the internal face of the nacelle wall, opposing the possibility that a leakage flow may develop through the aperture.

In this way, the flow $F_i$ is channeled at its periphery up to discharging end 26a as if there had been no radial aperture in the nacelle wall.

The fluidic barrier (controlled circulation of fluid) constitutes a kind of artificial wall situated in the prolongation of upstream wall part 24a and that closes aperture 28.

In this way, the invention makes it possible to amplify the direct jet thrust compared with the direct jet thrust that would be obtained with a nacelle equipped with a variable nozzle system without a fluid barrier.

This advantageous contribution of almost the entire internal flow $F_i$ to the total balance of thrust of the engine makes it possible to increase the general propulsive efficiency of the translationally variable nozzle.

As an example, when a high flowrate and a high pressure of the inducing fluid are chosen, the fluid jet adheres to surface 35 and in general to the entirety or almost the entirety of external face 24c.

It will be noted that it is possible to modify a single one of the thermodynamic and aerodynamic parameters, for example the flowrate, in order to constitute an effective fluidic barrier.

By varying the size of the injection orifice at the outlet of the injection nozzle, for example by an arrangement of diaphragm type, it is possible to vary the injection velocity and thus the flowrate of injected fluid.

Furthermore, when the fluid-control device is activated, the injection of fluid can be achieved either in a continuous stream or in a pulsed stream, to limit the consumption of injected fluid.

It should be noted that the aerodynamic forces associated with the operation of the device according to the invention are concentrated mainly on fluid-control device 30 mounted in annular manner on the nacelle wall, which makes it possible to improve the distribution of forces to be transmitted within the nacelle structure and thus to optimize the geometry and weight of the nacelle structure.

Furthermore, the integration of the fluid-control device on the nacelle wall has only very little influence on the internal and external acoustic treatment thereof.

In fact, in the collapsed position represented in the top part of FIG. 2, the device according to the invention permits the integration of an acoustic parietal lining over almost the entirety of the internal and external faces of the nacelle wall.

In addition, the size of fluid-control device 30 is relatively small, which facilitates its integration into the said wall.

It will be noted that the positioning of fluid-control device 30 upstream from aperture 28 permits this device to form a particularly effective fluidic barrier in simple manner.

Figure 4:
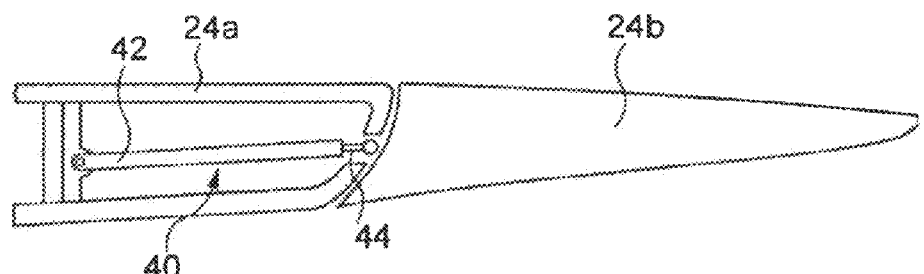
FIGS. 4 and 5 are partial schematic views of a mechanism for displacement of the rear part of the nacelle wall to collapsed and extended positions respectively.

FIG. 4 represents an embodiment of a means for translational displacement of rear part 24b of the nacelle wall.

An internal pocket formed in upstream part 24a, in a zone in which fluid-control device 30 is not present, accommodates a double-effect actuator 40, for example of pneumatic or hydraulic type.

Fixed part 42 or the body of the actuator, is secured to the bottom of the pocket, while mobile part 44 or the rod of the actuator, is fixed to rear part 24b.

In this figure, rear part 24b is not translated and is mounted against front part 24a in collapsed position (actuator retracted).

Figure 5:
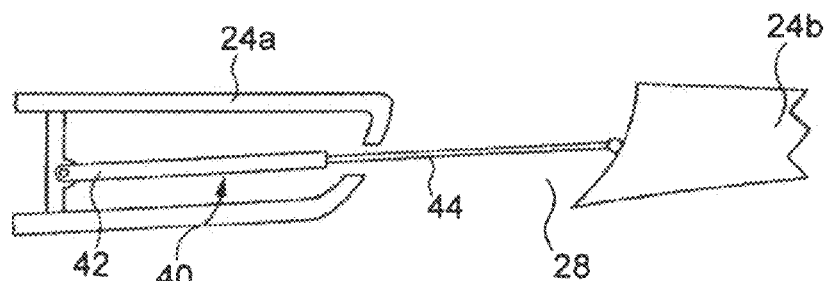

In FIG. 5, the outward movement of rod 44 of the actuator is commanded and rear part 24b is deployed, thus creating aperture 28 in the nacelle wall, starting from the junction between upstream and downstream parts 24a and 24b respectively.

It will be noted that a plurality of actuators of this type are arranged, for example, on the circumference of upstream wall part 24a in order to translate the rear part effectively.

The invention also applies to turbojets of high or very high bypass ratio equipped with variable cross section nozzles that are not of the translation type.

It will be noted that a variable cross section nozzle used as equipment of such turbojets makes it possible to adapt to the different phases of operation of the airplane (cruising flight, low speed).

The integration of variable nozzle systems in turbojets with high bypass ratio significantly improves the thermodynamic performances thereof.

In fact, in turbojets installed on airliners and having very high bypass ratios (close to 10), the compression ratio of the fan, the main contributor to the total thrust of the turbojet, is low (around 1.4). There is achieved an increase of the sensitivity of the aerodynamic performances of this fan with respect to the flying speed of the airplane (sonic speed).

In the case of a turbojet having a very high bypass ratio not equipped with a variable nozzle system, the choice of the aerodynamic operating characteristic of the fan is a compromise between the aerodynamic efficiency in cruising flight and the surge margin (unsteady phenomena detrimental to engine integrity) at low flying speeds.

In the case of a turbojet having a very high bypass ratio this time equipped with a variable nozzle system, such a compromise is unnecessary by virtue of the adaptation of the outlet cross section of the nozzle to the operating speed of the fan. The efficiency thereof is then increased in each flying phase.

Figure 6:
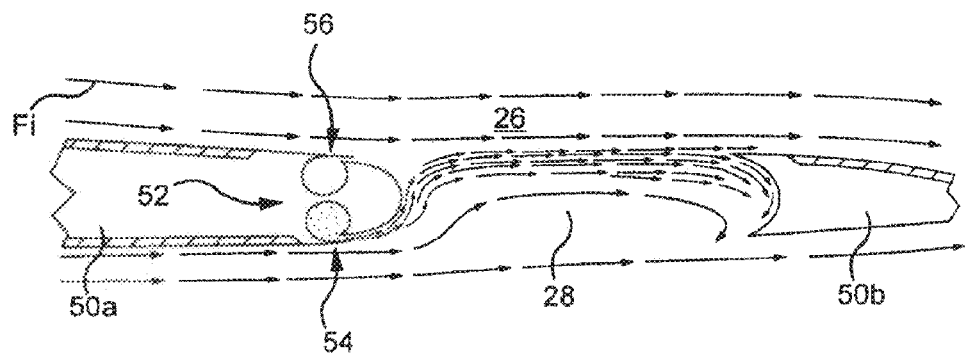
FIG. 6 represents a partial schematic view in longitudinal section (analogous to that of FIG. 3) of a wall of an aircraft engine nacelle according to a second embodiment of the invention.
Figure 7:
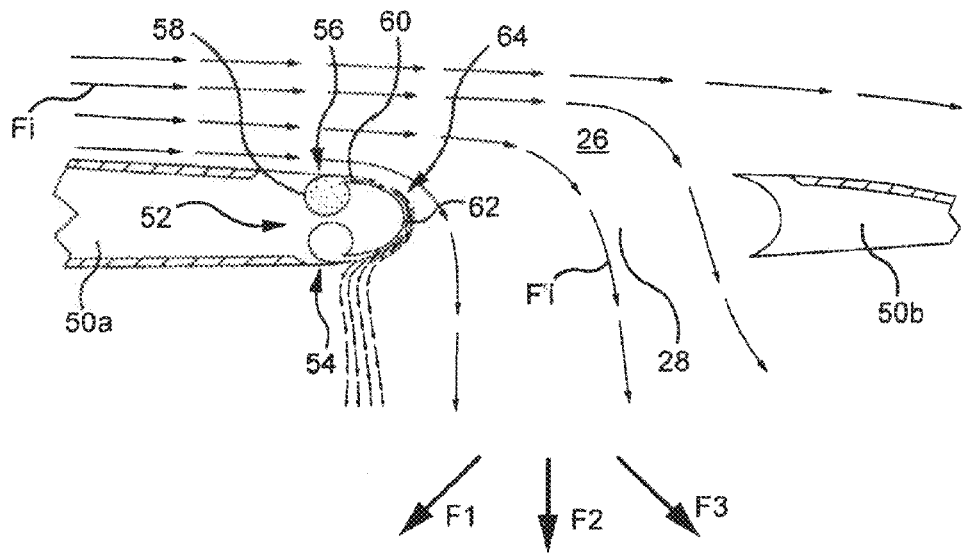
FIG. 7 illustrates another mode of operation of the embodiment represented in FIG. 6.

According to a second embodiment, FIGS. 6 and 7 represent, in a manner analogous to FIG. 3, the structure of an upstream nacelle wall 50a defining, together with a downstream nacelle wall 50b translated toward the rear, one or more radial apertures 28, only one of which is represented.

In these figures, upstream nacelle wall 50a integrates a fluid-control device 52 that differs from device 30 of FIGS. 2 and 3.

In this second embodiment, the other elements of the nacelle remain identical to those described with reference to FIGS. 2 and 3.

Device 52 is in fact a double controlled-circulation system, which is provided on the one hand with a first device 54 for forming a fluidic barrier identical to device 30 of FIGS. 2 and 3, and on the other hand with a second fluid-control device 56 independent of the first and that in the example under consideration ensures a different function, as will be seen hereinafter.

These two devices are mounted in the proximity of the junction zone with downstream wall part 50b when the latter is in the retracted position represented in the top part of FIG. 2.

Thus first device 54 makes it possible to control the aerodynamic circulation of internal flow $F_i$ in conduit 26 by limiting or even canceling out the aerodynamic leaks that would be developed through aperture 28 in the absence of the device.

Second device 56 is disposed in the nacelle wall, on internal face 50c of upstream wall part 50a, which bounds annular conduit 26 at its external periphery.

When this second device is activated, it makes it possible to control the aerodynamic circulation of internal flow $F_i$ by ensuring in particular the thrust-inversion function when the mobile element or elements of the nacelle (such as downstream wall part 50b) are deployed.

In this way the double system for controlled circulation of fluid ensures two distinct functions (leakage limitation and "thrust inversion") without relying on additional moving pieces and by the same token avoiding additional servo systems.

More particularly, fluid-control device 56 is provided to control the withdrawal of an amount or fraction of the internal flow in conduit 26 and to evacuate it from the nacelle in controlled manner via radial aperture 28.

To this end, device 56 is capable of injecting a high-energy fluid into internal flow Fi.

This injection of fluid is effected in substantially tangential manner at internal face 50c, in a flow zone in which this flow must be diverted, or in other words slightly upstream from the trailing edge of part 24a.

More particularly, fluid-control device 50c is provided with a supply duct for fluid, which is, for example, pressurized air arriving from the engine.

This fluid supply duct has a part, not illustrated, that communicates with the pressurized air source of turbojet 16, and an annular part 58 partially represented in section in FIG. 7. This duct 58 is constructed in a manner identical to that of the duct of device 30 or 54.

Fluid-control device 56 is additionally provided with one or more injection nozzles 60, which communicate with duct 58 and discharge onto internal face 50c, thus making it possible to inject a high-energy fluid into the internal fluid flow Fi in conduit 26 in proximity to aperture 28 (FIG. 7).

A curved surface 62 constituting the trailing edge of upstream wall 50a and the end face of this wall is disposed at the outlet of injection nozzle 60, tangentially thereto. According to the longitudinal sectional view of FIGS. 6 and 7, this surface has semi-circular shape, for example.

As represented in FIGS. 6 and 7, the pressurized fluid being transported by the duct is introduced in the form of a jet 64 into the internal fluid flow Fi (more particularly, at the periphery thereof) by injection nozzle 60, tangentially to internal face 50c, and in this way modifies a fraction of this flow in controlled manner.

The jet injected in this way exits the nozzle with a given orientation, tangentially to a curved trailing edge, which in this case is surface 62, then assumes the shape of the trailing edge, as represented in FIG. 7, to the extent that the centrifugal force tending to detach it is balanced by the reduced pressure developed between the wall and the jet.

The injected fluid jet is therefore diverted by curved surface 62.

When the balance is disrupted, the jet injected into the flow detaches from the trailing edge and forms the rear stopping point of the profile at the point of separation.

As represented in FIG. 7, a part F'i of the internal fluid flow Fi is diverted from its trajectory under the action of the injected jet.

The energy input by the fluid injected via injection nozzle 60 makes it possible to control the position of the point of separation.

It will be noted that the direction of the injected fluid jet is controlled by causing the position of the point of separation of the jet on surface 62 to vary.

Thus the withdrawn flow part F'i is oriented differently as a function of the zone of surface 62 in which the jet is detached.

This point of detachment of the fluid jet, or in other words the orientation of the jet, varies as a function of at least one of the thermodynamic and aerodynamic parameters of the fluid, namely, for example, the pressure and/or the temperature and/or the flowrate and/or the velocity and/or the turbulence ratio, etc.

As an example, by increasing the flow and the pressure of inductive fluid, the fluid jet adheres to surface 62 over a great length, and the withdrawn flow Fi is diverted toward upstream of the nacelle in the direction F1 in FIG. 7 (thrust inversion).

When the direction imparted to the amount of withdrawn fluid is substantially that indicated by arrow F2, namely radially relative to longitudinal flow Fi, the direct thrust of the withdrawn flow is then canceled out.

In addition, when the amount of internal flow Fi of withdrawn fluid is oriented in the direction represented by arrow F3, or in other words toward downstream of the nacelle, the direct thrust produced by the withdrawn flow is then reduced.

It will be noted that it is possible to modify a single one of the thermodynamic and aerodynamic parameters, for example the flowrate, in order to act on the amount of fluid withdrawn.

By varying the size of the injection orifice at the outlet of the injection nozzle, for example by an arrangement of diaphragm type, it is possible to vary the injection velocity and thus the flowrate of injected fluid.

Furthermore, the injection of fluid can be achieved either in a continuous stream or in a pulsed stream, to limit the consumption of injected fluid.

The establishment of an effective system with which the thrust vector of the propulsion system can be inverted, canceled out or reduced is achieved during certain flying phases of the aircraft, by translating the rear part of the nacelle wall as represented in FIG. 7. In this way one or more apertures 28 is or are uncovered on the flank of the nacelle between secondary stream Fi circulating in annular conduit 26 and the atmosphere.

It should be noted that, when rear part 50b of the nacelle wall has been displaced toward the rear, the outlet nozzle of the secondary stream no longer combines the conditions suitable for generation of a thrust vector.

In fact, the nozzle then forms a divergent section, and the secondary stream, which is a subsonic flow, loses its energy on exiting the nacelle.

The device according to the invention for inverting, canceling out or reducing the thrust is simpler than the known systems inasmuch as the only mobile part in this case is the rear part of the nacelle wall, which considerably simplifies the kinematics of the device.

The aerodynamic forces associated with the operation of the device according to the invention are concentrated mainly on the fluid-control device mounted in annular manner on the nacelle wall, which makes it possible to improve the distribution of forces to be transmitted within the nacelle structure and thus to avoid having to overdimension certain parts of the nacelle.

In addition, the fluid-control device tends to mask downstream wall 50b from the surrounding flow, thus avoiding the need to overdimension this wall.

Furthermore, the integration of the fluid-control device on the nacelle wall has only very little influence on the internal and external acoustic treatment of the latter.

In fact, in the collapsed position represented in the top part of FIG. 2, the device according to the invention permits the integration of an acoustic parietal lining over almost the entirety of the internal and external faces of the nacelle wall.

In addition, the size of the fluid-control device is relatively small, which facilitates its integration into this wall.

FIGS. 8a, 8b, 8c, 9a, 9b, 9c and 10a, 10b, 10c illustrate two different modes of operation of a third embodiment of the invention.

Figure 8A:
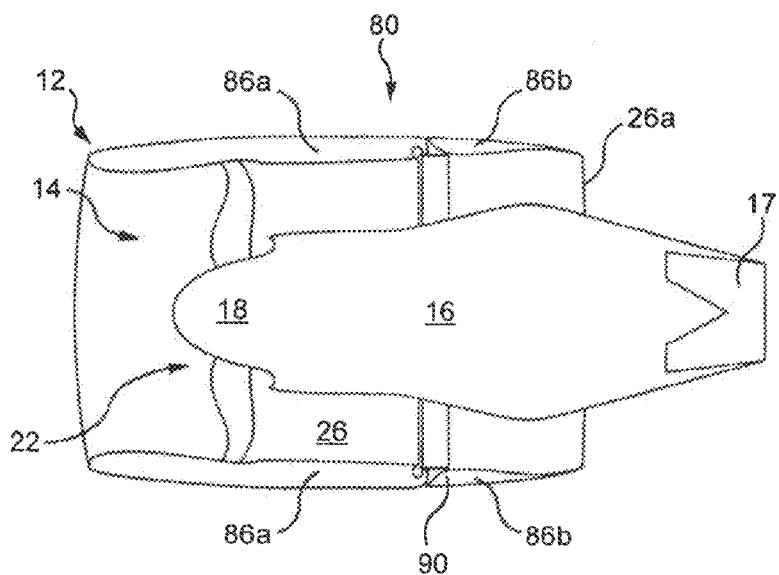
Figure 8B:
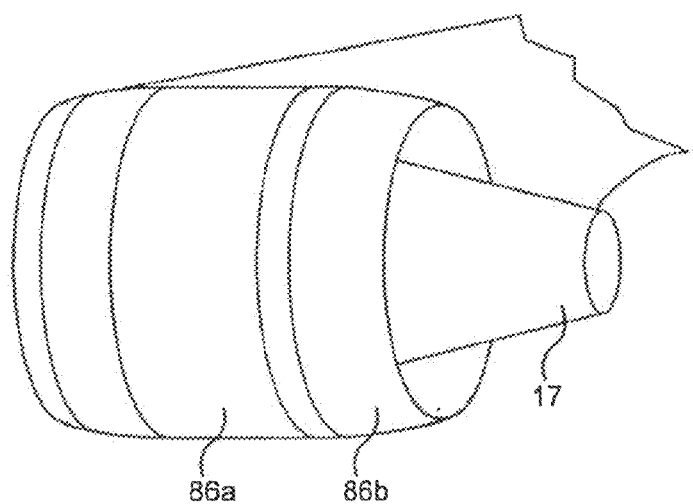
Figure 8C:
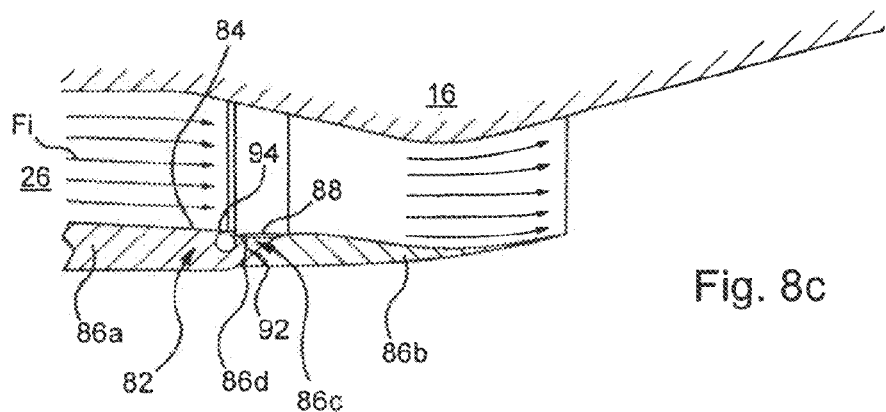

FIGS. 8a, 8b and 8c represent different views of an aircraft engine nacelle 80 of the type of that in FIG. 2: in longitudinal section (FIG. 8a), in perspective (FIG. 8b) and in an enlarged partial view (FIG. 8c).

In FIGS. 8a-c, the variable nozzle system is collapsed, whereas it is deployed in FIGS. 9a-c and 10a-c.

Figure 9A:
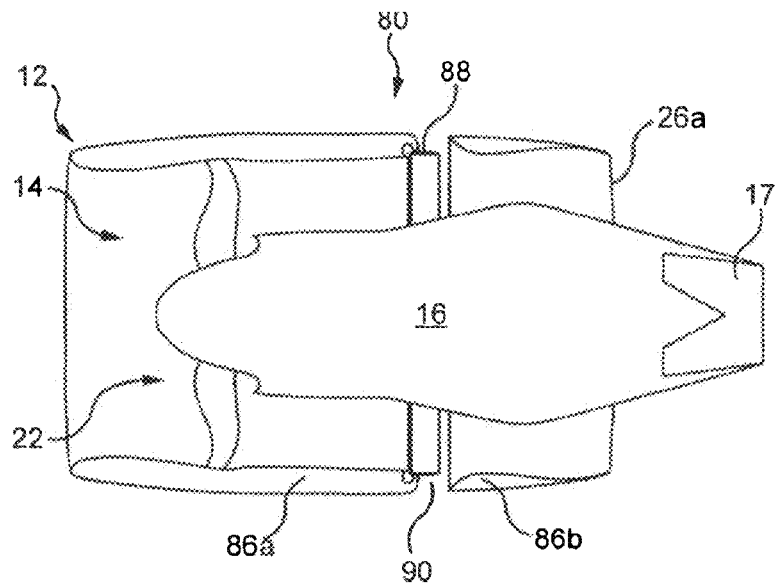
Figure 9B:
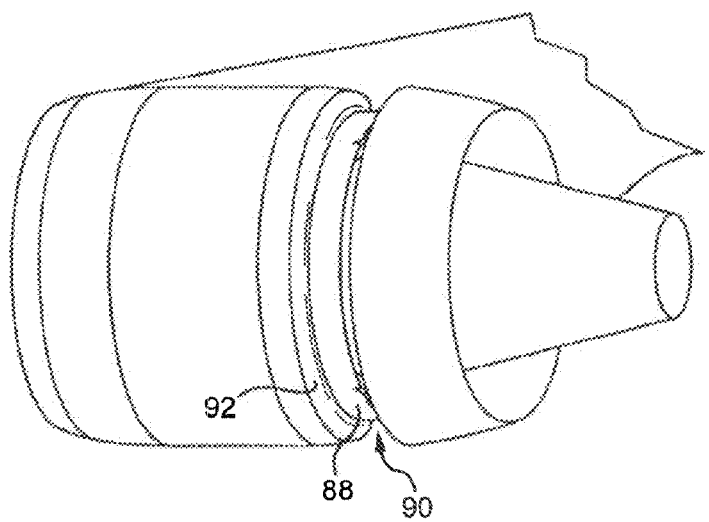
Figure 9C:
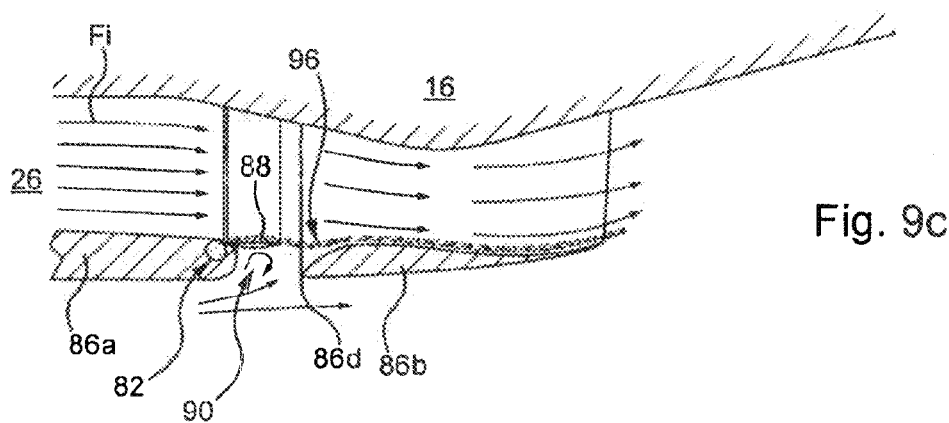

In FIGS. 9a-c, a fluid-control device for forming a fluidic barrier is activated and cooperating with a mobile channeling element, in order to limit or even prevent the formation of a leakage flow.

Figure 10A:
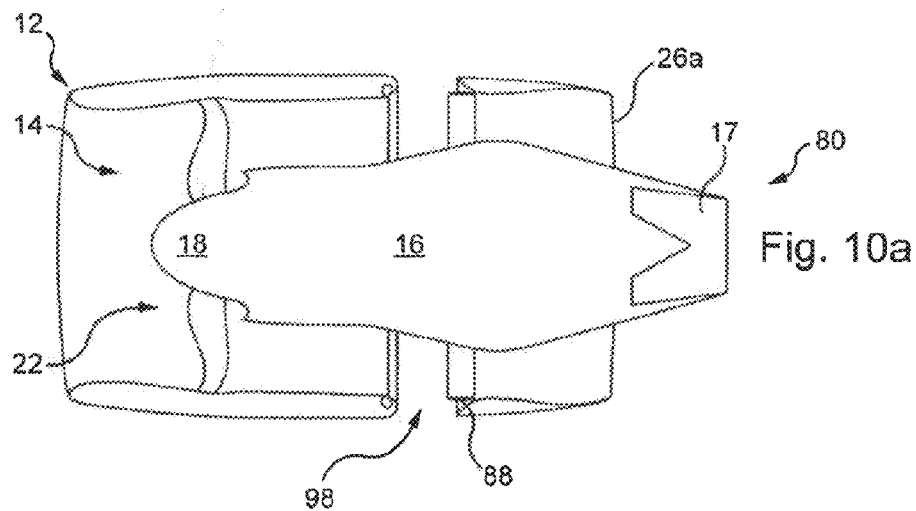
Figure 10B:
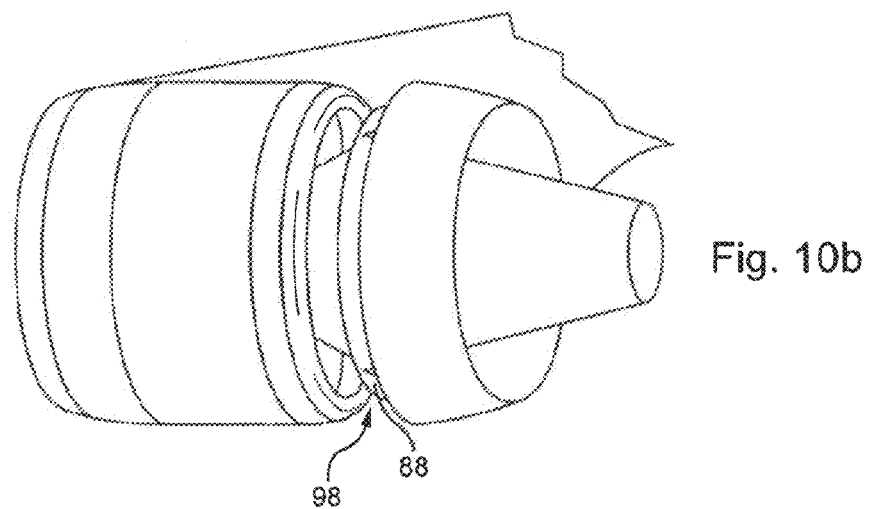
Figure 10C:
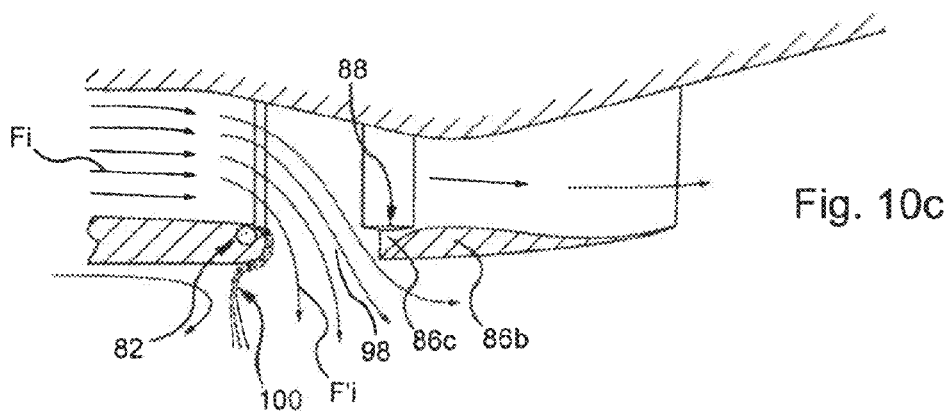

In FIGS. 10a-c, the mobile channeling element has been displaced, so that it is no longer associated with the fluid-control device, and the latter assures a function of controlled withdrawal of at least part of internal flow Fi, just as fluid-control device 56 in FIG. 7.

The nacelle illustrated in FIGS. 8a-c, 9a-c and 10a-c differs from that of FIG. 2 by the presence of the following elements:

a fluid-control device 82 is mounted on internal face 84 of an upstream part 86a of the nacelle wall, just as device 56 of FIG. 7, and it controls the aerodynamic circulation of internal flow Fi in the zone situated between the fixed and mobile elements of the nacelle;

one or more mobile deflecting elements 88 (aerodynamic deflector(s)) is or are provided to cooperate either with fluid-control device 82 (FIGS. 9a-c) or with mobile downstream part 86b of the nacelle wall (FIGS. 8a-c and 10a-c), whose shape has been adapted for this purpose.

The mobile elements of the nacelle which are downstream part 86b and deflecting element or elements 88, possess at least one degree of translational freedom along the axis of the turbojet, and form, in particular, the external and/or internal aerodynamic fairing for the stream at the nozzle.

Deflecting element 88 distinct from upstream wall part 86a is, for example, an aerodynamic flap or deflector of annular shape, and this mobile element is positioned in the prolongation of the internal face of the upstream and downstream wall parts of the nacelle, in order to be mounted at the periphery of internal flow Fi.

A plurality of deflecting elements, each having the form of a portion or sector of an annulus, may be used alternatively instead of a single element.

In the position illustrated in FIGS. 8a-c, flap 88 is in collapsed position against fixed part 86a of the nacelle, as is downstream part 86 of the nacelle wall.

Moreover, this downstream part 86b is configured in such a way that it is able to come into contact with fixed part 86a, despite the presence of flap 88.

In this regard, downstream part 86b possesses, in its upstream part situated opposite wall part 86a, a recess 86c, giving it a substantially frustoconical flared shape, in which flap 88 can be seated. The end of this flared upstream part constitutes leading edge 86d of downstream wall part 86b, which edge comes against upstream wall part 86a.

In this way, mobile elements 88 and 86b are positioned against the fixed part of the nacelle in such a way that the aerodynamic lines are continuous.

During the flying phases in which the variable nozzle mechanism is employed, part of the mobile elements of the nacelle, namely downstream part 86b, is displaced toward the rear by longitudinal translation (FIGS. 9a-c), in order to bring about variation of the cross section of the nozzle.

This displacement uncovers one or more radial apertures on the nacelle flanks, in this case a single aperture 90 in this exemplary embodiment.

The other part of the mobile elements of the nacelle, namely element 88, in turn remains in the collapsed position of FIGS. 8a-c, against fixed part 86a of the nacelle wall. More particularly, element 88 is disposed against curved surface 92, disposed tangentially to the discharging end of injection means 94 (injection nozzle) of fluid-control device 82.

This surface is identical to surface 62 of FIG. 7.

As represented in FIGS. 9a-c, following displacement of downstream part 86b to the rear, element 88 is disposed in aperture 90 that was formed, and it blocks an upstream zone thereof. A so-called downstream zone of this aperture situated between element 88 and downstream part 86b is uncovered.

The displacement of downstream part 86b initiates, for example, the activation of fluid-control device 82, for example by way of an optical transducer.

This activation may nevertheless be remote-controlled (for example, on the flight deck), with the command to employ the variable nozzle mechanism.

Thus high-energy fluid jet 96 emerging from injection means 94 is diverted by deflecting element 88 in a longitudinal direction, instead of adhering to surface 92 in the way that jet 64 adheres to surface 62 of FIG. 7.

Element 88 then channels jet 96 into the interior of annular conduit 26, and this jet continues its substantially longitudinal trajectory beyond element 88, or in other words into the aperture zone that is free of any physical obstacle.

In this way, the aerodynamic circulation of internal flow Fi is controlled at right angles to aperture 90, by limitation, or even suppression of undesirable flows through the latter (leakage flows).

In fact, deflecting flap 88 itself forms an obstacle to internal flow Fi, thus preventing part of the latter from escaping through the upstream zone of annular aperture 90.

Furthermore, the injection of fluid tangentially to the deflecting flap generally makes it possible to control the aerodynamic circulation at the location of aperture 90 and to limit, by aerodynamic induction, the natural tendency of part of internal flow Fi to escape via this aperture.

More particularly, injected fluid jet 96 extends longitudinally along aperture 90. This jet channels internal flow Fi over the entire length of the radial aperture, or in other words along the upstream zone of this aperture, where guide 88 is positioned, and along the uncovered downstream zone.

In this embodiment, the injected jet skirts the inlet of the aperture without penetrating into it, as in FIGS. 3 and 6.

Thus jet 96 forms an annular fluidic barrier, which surrounds internal flow Fi at right angles to aperture 90, while element 88 acts as a guide support for this jet.

It will be noted that deflecting element 88 is not able to occupy the entire length of radial aperture 90, because such dimensioning would be detrimental to operation as a "thrust inverter", which is illustrated in FIGS. 10a-c.

It will be noted that the mobile elements of the nacelle are displaced continuously or discontinuously by virtue of a servo system. By way of a non-exhaustive exemplary embodiment, downstream wall part 86b may be actuated by one or more linear actuators of hydraulic type controlled by the engine control system. Part 88 in turn may also be actuated by one or more linear actuators of hydraulic type controlled by the engine control system. These servo devices may be fixed on the one hand to structurally reinforced zones of mobile elements and on the other hand to a fixed structural frame of the engine nacelle.

FIGS. 10a-c illustrate the operation of the nacelle in "thrust inverter" mode, which is used in certain flying phases of the aircraft equipped with such nacelles.

When this mode of operation is commanded, downstream part 86b of the nacelle is translated more toward the rear of the nacelle and deflecting element 88 is also translated toward downstream. It is separated from surface 92 and is reunited with this downstream part 86b to become seated in recess 86c.

In this way a radial aperture 98 of greater length than aperture 90 is created and is bordered on one side by the curved surface of end 92 of fixed part 86a and on the other side by mobile elements 86b and 88.

By way of example, the axial length of aperture 90 lies within a range on the order of 50 to 200 mm, while that of aperture 98 lies within a range on the order of 450 to 600 mm.

It will be noted that element 88 may be provided with a radial extension of concave shape, extending into the interior of aperture 98, in such a way as to give the assembly of elements 86b and 88 an end surface analogous to concave surface 24d of FIG. 2, in order to improve the internal aerodynamic lines.

As soon as the mobile elements are in the extreme position of FIG. 10c, fluid-control device 82 is activated and then behaves as a device for controlled withdrawal of a part F'i of internal flow Fi, in a manner identical to that of device 56 of FIG. 7, and generates a controlled jet 100.

In this way the thrust vector of the propulsive system is inverted, canceled out or reduced, depending on the intended objective.

It will be noted that the presence of means for injection of a high-energy fluid mounted on the internal face of the nacelle wall, upstream from the aperture or apertures, and of a deflecting element downstream from these means, makes it possible to achieve two functions with a single injection system.

FIG. 11 illustrates a final embodiment, in which the engine nacelle is identical to that represented in FIG. 2, with the exception of the fluid-control device.

In fact, in FIG. 11 fluid-control device 110 for forming a fluidic barrier $f'_i$ is integrated into downstream wall part 112b. Downstream part 112b is separated from fixed upstream part 112a under the action of driving means, such as those of FIGS. 4 and 5, thus producing one or more apertures 114 between the respective complementary end faces of the two parts 112a and 112b.

Device 110 is mounted on external face 112c of downstream part 112b, at the leading edge (end face) of this part.

Device 110 has a curved surface 116 disposed tangentially to the discharging end of injection nozzle 118.

Nozzle 118 communicates with a supply duct for high-energy fluid to be injected, one part 12a thereof extending into the interior of downstream part 112b.

The fluid is injected in the form of a jet into aperture 114 in continuous or pulsed manner and, by virtue of tangential curved surface 116, the jet is directed in controlled manner toward annular conduit 26, at first by following a part of surface 116 up to the predetermined detachment point.

The jet thus detached from the surface is directed toward upstream wall part 112a, skirting internal flow Fi in opposite direction, and then comes to sweep past end face 112d of part 112a, then exits the aperture to rejoin external air flow A.

A controlled circulation of fluid is therefore established in aperture 114, along the entire longitudinal extension thereof, and forms a fluidic barrier f'i within the aperture, in order to limit or even prevent the passage of leakage flow via the aperture.

The nacelle according to this fourth embodiment of the invention achieves the same advantages as those of the nacelle of FIGS. 2 to 5.

It will be noted that the fluidic obstacles formed in FIGS. 3 and 11 are located more toward the inlet of the aperture, or in other words on that side of the aperture along which internal flow $F_i$ is situated. Thus the fluidic obstacle behaves as a fluid wall, along which the internal flow is guided, without being able to penetrate into the aperture.

By way of a variant, an aircraft engine nacelle may be provided on the one hand with a fixed upstream wall equipped with a fluid-control device of the type of device 82 of FIGS. 10a-c, in order to achieve controlled withdrawal of internal flow, and on the other hand with a mobile downstream wall equipped with a fluid-control device of the type of device 110 of FIG. 11, in order to form a fluidic barrier.

In this way the two different functions are assured solely by controlled injection of high-energy fluid, without additional mobile pieces.

The invention claimed is:

1. An aircraft engine nacelle having a high bypass ratio, wherein there is installed an engine with longitudinal axis, the nacelle comprising:
   a wall that concentrically surrounds the engine at least partially and that defines therewith an annular internal fluid flow conduit, which at a downstream end of the nacelle wall includes a flow-outlet passage cross section;
   a displacement device to displace a part of the nacelle wall, on command, to vary the flow-outlet passage cross section and to create at least one aperture of longitudinal extension in the nacelle wall; and
   a device located by the downstream end for injecting a high-energy fluid to form a fluidic barrier, the fluidic barrier extending along at least a part of the longitudinal extension of the at least one aperture to oppose natural escape of flow through the at least one aperture.

2. The nacelle according to claim 1, wherein the device for forming a fluidic barrier includes at least one injection device to inject the high-energy fluid at right angles to the at least one aperture.

3. The nacelle according to claim 1, further comprising a fluid-control device for controlled withdrawal of at least a part of an internal fluid flow to evacuate the at least a part of the internal fluid flow from the nacelle through the at least one aperture.

4. The nacelle according to claim 3, wherein the fluid-control device for controlled withdrawal includes at least one injection device to inject the high-energy fluid into the internal fluid flow.

5. The nacelle according to claim 2, wherein the at least one injection device is mounted upstream and/or downstream from the at least one aperture.

6. The nacelle according to claim 2, wherein the at least one injection device is mounted on an internal face and/or an external face of the nacelle wall that bounds the annular conduit at an external periphery thereof.

7. The nacelle according to claim 6, wherein the at least one injection device is mounted on the internal face of the nacelle wall and is at least partially in the at least one aperture, and
   wherein the device for forming a fluidic barrier includes at least one mobile element for deflecting the injected high-energy fluid, the mobile element being disposed adjacent to the at least one injection device.

8. The nacelle according to claim 7, wherein the at least one mobile element blocks an upstream zone of the at least one aperture to free a downstream zone thereof.

9. The nacelle according to claim 2, wherein the at least one injection device is equipped with at least one nozzle for injecting the high-energy fluid.

10. The nacelle according to claim 2, wherein the device for forming a fluidic barrier has a curved surface and is disposed tangentially at a discharging end of the at least one injection device to direct the injected high-energy fluid toward the said at least one aperture.

11. The nacelle according to claim 2, further comprising a fluid-control device for controlled withdrawal of at least a part of an internal fluid flow to evacuate the at least a part of the internal fluid flow from the nacelle through the at least one aperture.

12. The nacelle according to claim 4, wherein the at least one injection device is mounted upstream and/or downstream from the at least one aperture.

13. The nacelle according to claim 4, wherein the at least one injection device is mounted on an internal face and/or an external face of the nacelle wall that bounds the annular conduit at an external periphery thereof.

14. The nacelle according to claim 13, wherein the at least one injection device is mounted on the internal face of the nacelle wall and is at least partially in the at least one aperture, and
   wherein the device for forming a fluidic barrier includes at least one mobile element for deflecting the high-energy injected fluid, the mobile element being disposed adjacent to the at least one injection device.

15. The nacelle according to claim 1, wherein a first end of the displacement device is mounted to a front part of the nacelle wall, and
   wherein a second end of the displacement device is mounted to a rear part of the nacelle wall.

* * * * *